United States Patent
Carr et al.

(10) Patent No.: US 6,982,867 B2
(45) Date of Patent: Jan. 3, 2006

(54) INFORMATION HANDLING SYSTEM EXPANDABLE BLANK CARD INSERT SYSTEM AND METHOD

(75) Inventors: Daniel S. Carr, Round Rock, TX (US); Lisa Sura, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 234 days.

(21) Appl. No.: 10/719,272

(22) Filed: Nov. 21, 2003

(65) Prior Publication Data

US 2005/0111168 A1    May 26, 2005

(51) Int. Cl.
    *H05K 5/00*    (2006.01)
(52) U.S. Cl. ..................................... 361/679; 361/683
(58) Field of Classification Search ............... 361/679, 361/683–685
    See application file for complete search history.

(56) References Cited

U.S. PATENT DOCUMENTS

| | | | |
|---|---|---|---|
| 5,914,854 A | * | 6/1999 | Holt ........................... 361/683 |
| 6,016,959 A | | 1/2000 | Kamo et al. ................ 235/449 |
| 6,684,283 B1 | | 1/2004 | Harris et al. ................ 710/302 |

* cited by examiner

*Primary Examiner*—Yean-Hsi Chang
(74) *Attorney, Agent, or Firm*—Hamilton & Terrile, LLP; Robert W. Holland

(57) ABSTRACT

A blank expansion card adjusts to selected widths within an information handling system expansion card bay having horizontally aligned connectors in order to provide support to an adjacent expansion card. The blank expansion card has a base that couples with an expansion card connector, a body extending from the base along a side wall of the expansion card bay, and an adjustable member that extends from the body an adjustable distance to engage the adjacent expansion card and ensure that the expansion card remains in position against an opposing side wall of the expansion card bay. The adjustable member essentially adjusts the width of the expansion card bay to snuggly fit expansion cards of varying width by extending from or retracting into a housing of the expansion card blank body.

20 Claims, 5 Drawing Sheets

INFORMATION HANDLING SYSTEM EXPANDABLE BLANK CARD INSERT SYSTEM AND METHOD

BACKGROUND OF THE INVENTION

1. Field of the Invention

The present invention relates in general to the field of information handling system card inserts, and more particularly to an expandable blank card insert system and method.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are adaptable to perform a number of different functions. One convenient way to provide additional functions to an information handling system is to use external cards adapted to support desired functions. An external card inserts into a card bay having a connector that interfaces the external card with the information handling system through a standard format, such as is defined by the PCMCIA standard. For example, portable information handling systems often accept a wireless network card in a PCMCIA bay to enable wireless network communications. The PCMCIA standard defines the size and layout of the external card and information handling system bay connectors so that power, control and data are exchanged in a defined manner. Standardized card and connector sizes allow manufacturers to offer desired functionalities by incorporating functions into a standard card that inserts into any standard compliant information handling system. Typically, portable information handling systems include two stacked PCMCIA bays. To protect the bay connectors from contaminants, blank cards are sometime inserted in the bays to block entry of contaminants into the bays, such as during shipping from a manufacturer to a purchaser of an information handling system.

One difficulty with standardized external cards is that some functions include components that do not readily fit in a defined bay slot. For example, one function proposed for external cards is a rotational storage media, essentially a miniature hard disc drive that inserts into a card bay. However, the rotational media tends to use more bay room than is typically need for other types of functions, such as wireless networking cards. A follow-on proposal to the PCMCIA standard provides for varying use of bay space with different sized external cards by placing two bays in a side-by-side horizontal configuration. The horizontal bay configuration allows an external card to interface with a single bay connector but use the space of the adjacent bay for components that will not fit in a single bay, such as an external card rotational storage media. However, external cards that have a variable width are often difficult to securely couple in a bay since support between the two bays is sacrificed to allow room for over-sized external card components. For instance, during shock and vibration testing, external card configurations that do not completely fill both adjacent horizontal bays are susceptible to being dislodged. Dislodging of a card during operation typically results in failure of the function performed by the card and can result in damage to the card or the bay connector.

SUMMARY OF THE INVENTION

Therefore a need has arisen for a system and method which adjusts an information handling system external card bay size to securely couple external cards of varying size within the bay.

In accordance with the present invention, a system and method are provided which substantially reduce the disadvantages and problems associated with previous methods and systems for coupling external cards within an information handling system external card bay. An external card blank adjusts in width to fill the gap left in an external card bay of an information handling system that accepts external cards of varying width.

More specifically, an external card blank has a base section 32 that couples with a connector of an information handling system external card bay having two adjacent horizontally aligned connectors. A body section extends from the base section along a side wall of the external card bay. An adjustable member extends from the body section into the external bay by an adjustable distance to engage an external card inserted in the adjacent connector and to thus maintain the external card against the opposing side wall of the external card bay. In one embodiment, the adjustable member rotationally couples to the body section with a spring that biases the adjustable member into the external card bay but allows an wide external card to push the adjustable member into a cavity of the body section and obtain support from the edge of the body section.

The present invention provides a number of important technical advantages. One example of an important technical advantage is that external cards having variable widths are securely coupled within an information handling system. The variable-sized external card blank expands or contracts to fill any gap between an inserted external card and the supporting side walls of the card bay so that movement of the external card is restricted within the card bay. By supporting the external card and restricting its movement, the card blank reduces the risk that shocks and vibrations applied to an information handling system will separate external card and bay connectors. Less risk of connector separation improves reliability in providing the function of the external card to the information handling system and decreases physical damage inflicted on card and bay connectors when a card is forced free from a connector, such as with rotational motion of the connectors relative to each other.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system external card bay width adjusts to secure external cards of varying width with an external card blank that fills gaps that otherwise would remain after insertion of an external card of a given width into an external card bay of a greater width. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
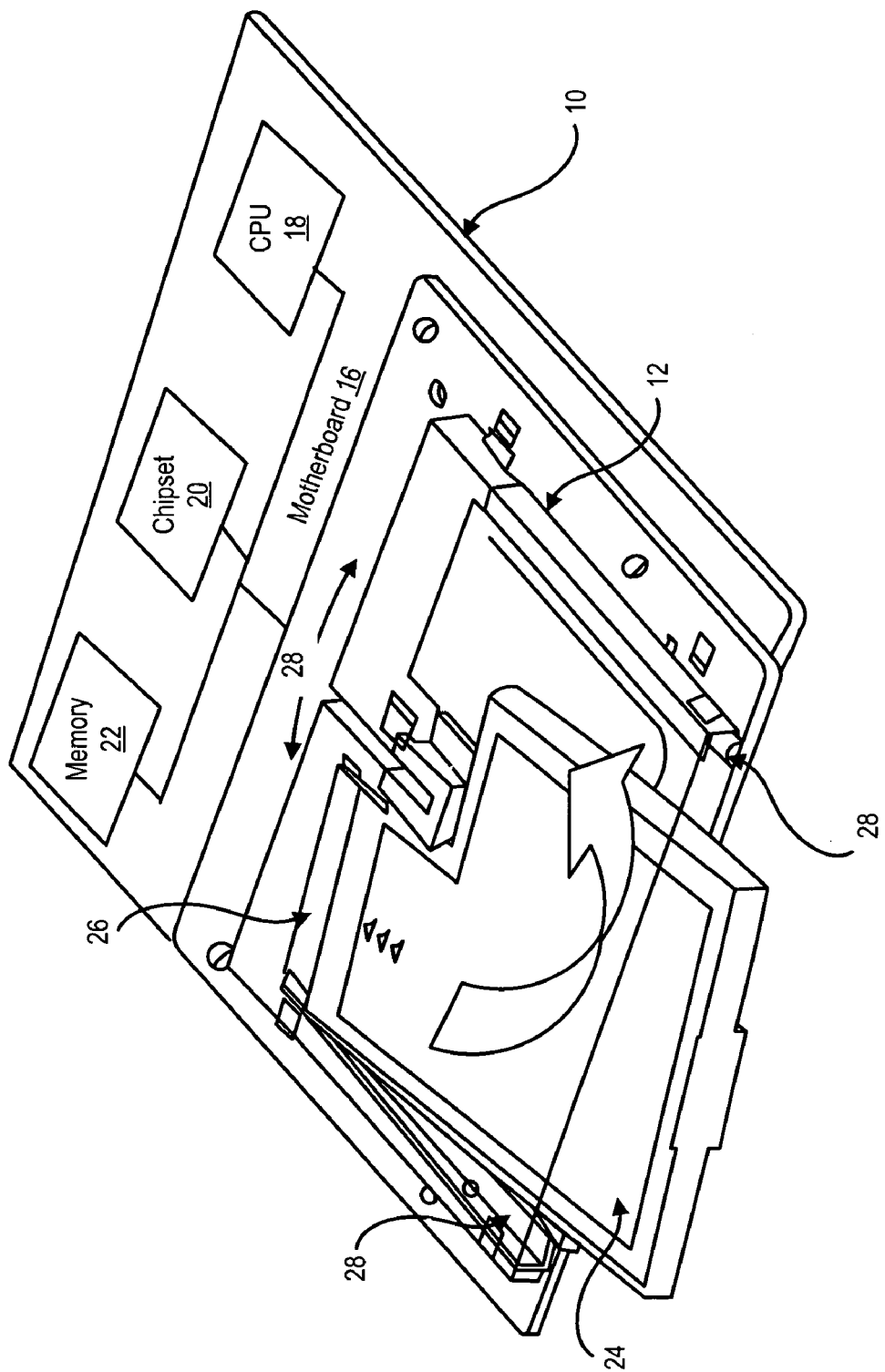
FIG. 1 depicts an information handling system having an external card bay with horizontally-aligned connectors.

Referring now to FIG. 1, a top perspective view of an information handling system 10 depicts one embodiment of an external card bay 12 having a pair of horizontally-configured connectors 14. The two bay connectors 14 each simultaneously holds a narrow configuration external card having a width of approximately 34 millimeters, or only one connector 14 is used to hold wide configuration external cards having a width of greater than 34 millimeters but less than the total width of external card bay 12. Connectors 14 interface with information processing components disposed on a motherboard 16, such as a CPU 18, chipset 20 and memory 22. Software or firmware running on CPU 18 or chipset 20 interacts with software or firmware on an external card 24 to enable desired functions, such as storage of information on a rotational media located within an oversized rectangular portion of external card 24. External card 24 inserts into external card bay 12 and electronically couples to a bay connector 14 with a card connector 26. When completely coupled, bay connector 14 and card connector 26 hold external card 24 in place against a side wall 28 of external card bay 12. However, for wide configuration external cards 24, such as the 54 millimeter rotational storage media depicted by FIG. 1, shock or vibration applied to information handling system 10 sometimes causes rotational movement of external card 24 within external card bay 12, resulting in failed communication and bent connector pins.

Figure 2:
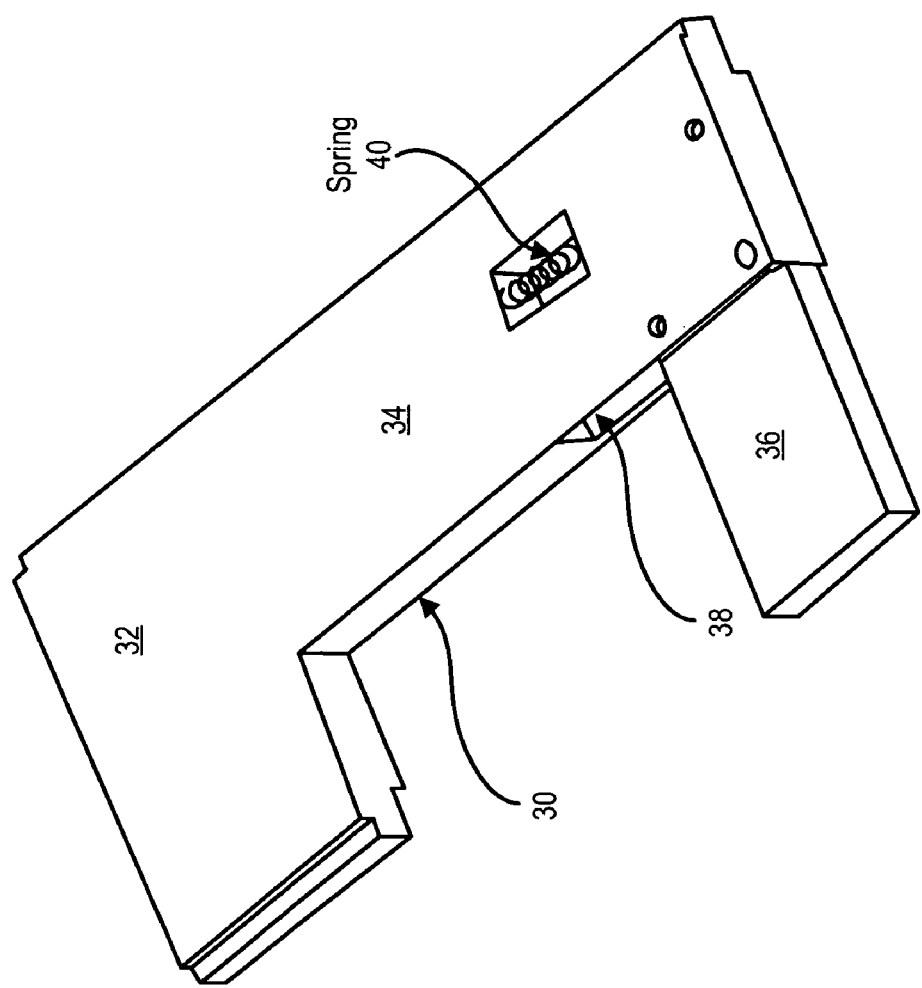
FIG. 2 depicts an external card blank having an adjustable width.

Referring now to FIG. 2, an external card blank 30 is depicted that adjusts its width to fill gaps in an external card bay that result from insertion of external cards of variable width. External card blank 30 has a base section 32 that is adapted to fit into an external card bay connector 14. A body section 34 extends from the base section and couples with an adjustable width support member 36. Member 36 extends from body section 34 into the external card bay to engage against an external card inserted in the bay adjacent to external card blank 30. The width of an external card plus the widths of body section 34 and the extended portion of member 36 equal the total width of the external card bay so that an external card next to external card blank 30 is held in position. Member 36 adjust the total width of external card blank 30 by extending from or retracting into a cavity 38 housed within body section 34. In the depicted embodiment, member 36 adjusts width of external card blank 30 by rotating into and out of cavity 38 with a spring 40 biasing member 36 to extend out from cavity 38. In an alternative embodiment, member 36 acts as a plunger that laterally extends from and retracts into body section 34.

Figure 3:
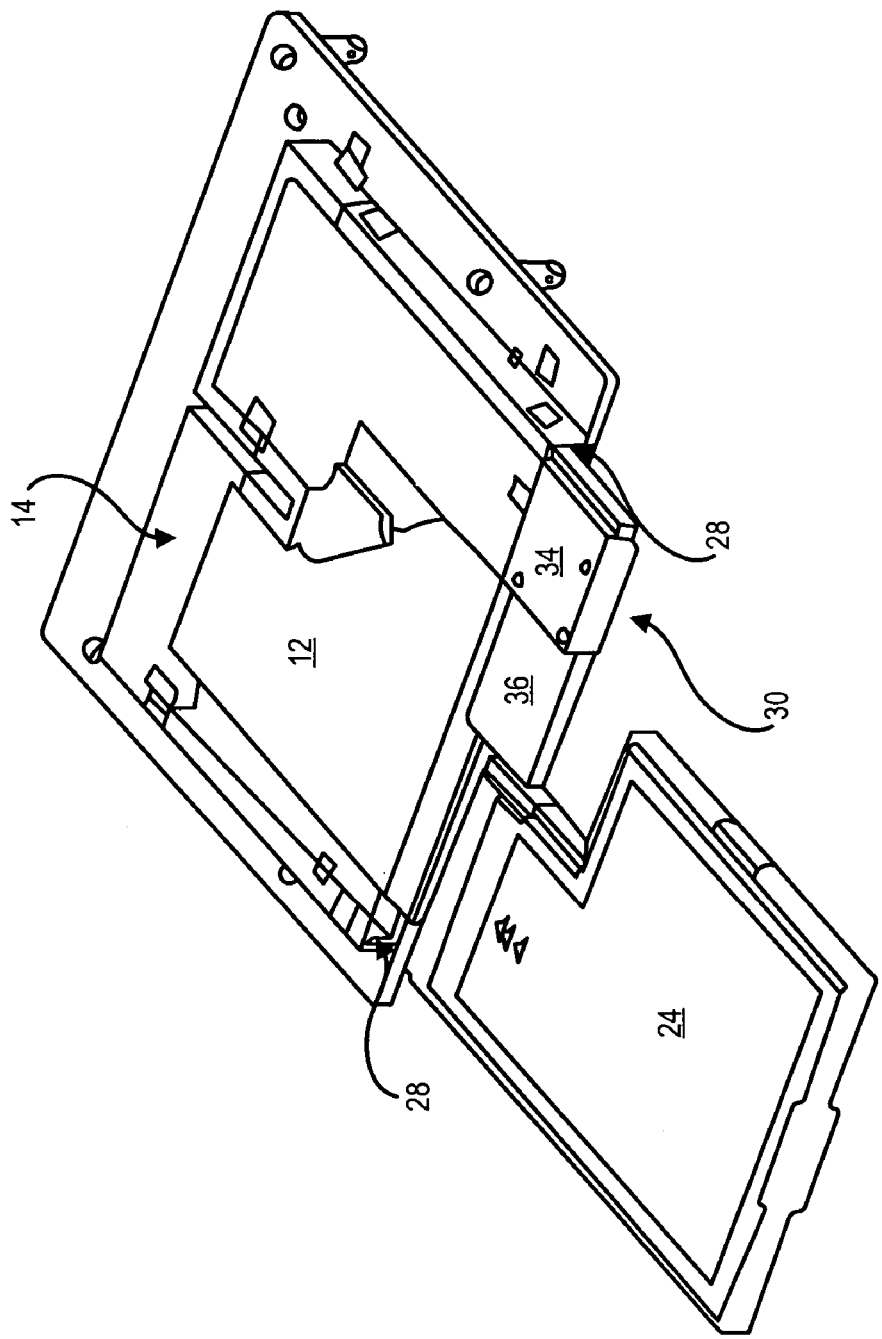
FIG. 3 depicts a rotational media external card aligned to insert in an external card bay having its width adjusted with an external card blank.
Figure 4:
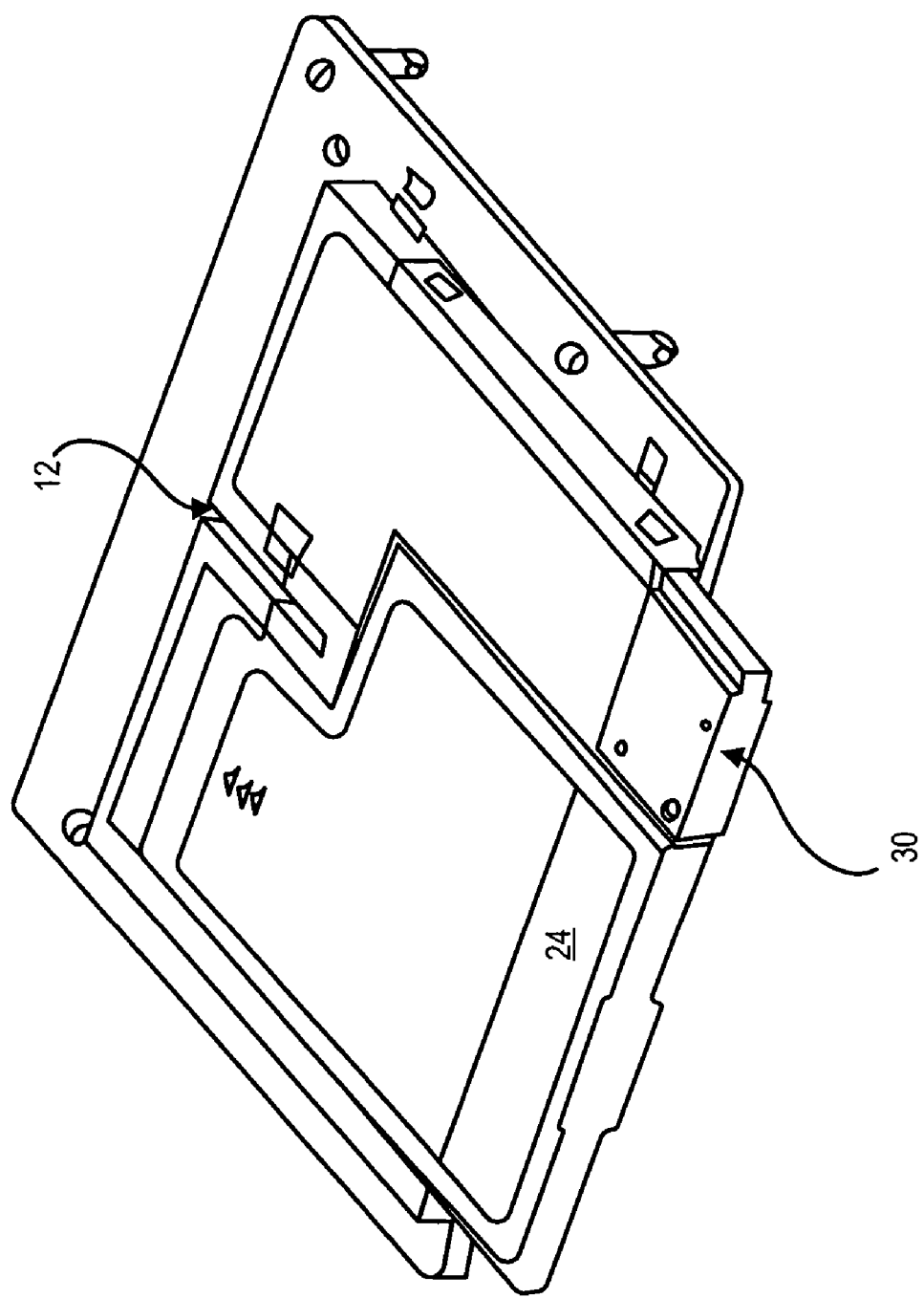
FIG. 4 depicts a rotational media external card secured in an external card bay with an external card blank.

Referring now to FIG. 3 a top perspective view depicts insertion of a rotational storage media external card 24 into external card bay 12 with an external card blank 30 used to securely couple card connector 26 to bay connector 14. External card 24 inserts to engage the left side wall 28 of bay 12 that guides connector 26 into connector 14. As external card 24 engages member 36, the bias provided by spring 40 is overcome, resulting in retraction of member 36 within body section 34 so that the inner edge of external card 24 engages against body section 34. Body section 34 in turn engages against the right side wall of bay 12 so that both edges of external card 24 receive support from the opposing side walls 28. FIG. 4 depicts external card 24 securely coupled within external card bay 12 so that shock and vibration applied to an information handling system is less likely to separate connectors 26 and 14 since the movement of external card 24 is restricted within external card bay 12 by engagement of side walls 28. In one embodiment, external card 24 and external card blank 30 are assembled into a single piece before insertion into external card bay 12.

Figure 5:
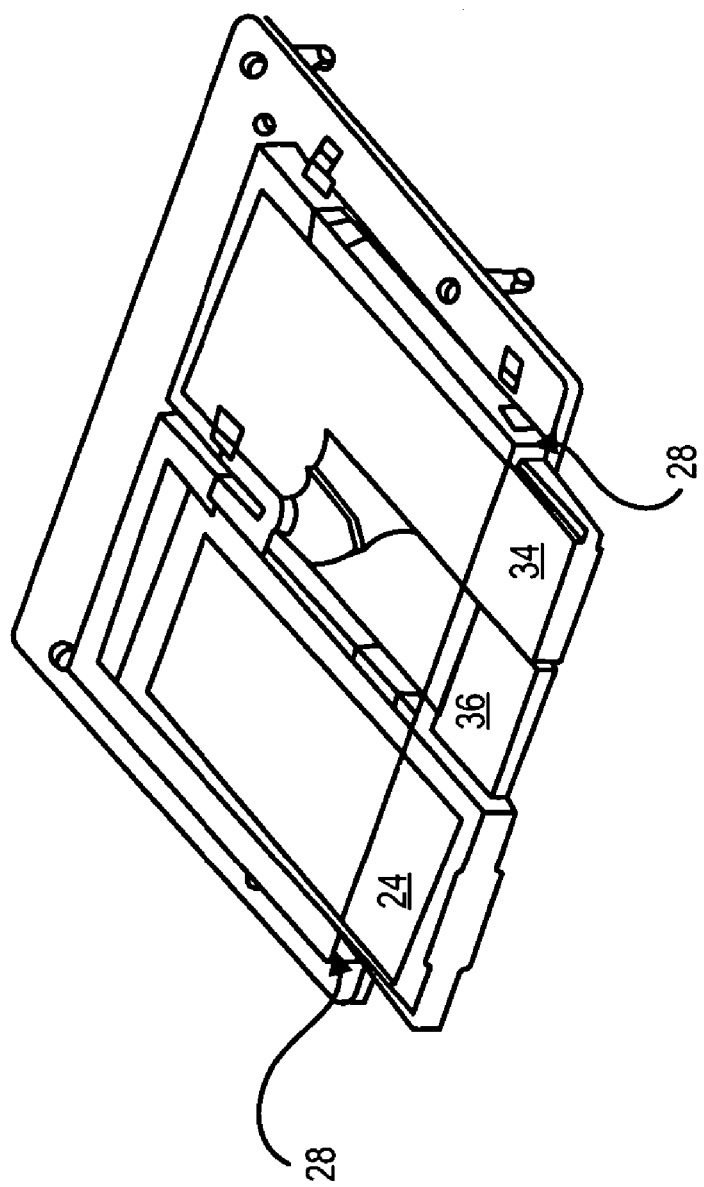
FIG. 5 depicts a wireless networking card secured in an external card bay with an external card blank.

Adjustment of the width of external card blank 30 is selectable to adapt to various combinations of widths of external cards and external card bays by selecting the size and degree of member 36 that extends into external card bay 12. In the embodiment depicted by FIG. 4, external card 24 is a rotational storage media having a width of approximately 54 millimeters and external card bay 12 is configured to receive two horizontally disposed 34 millimeter cards for a total width of approximately 68 millimeters. Body section 34 of external card blank 30 has a width of approximately 14 millimeters so that member 36 completely retracts to allow the inner side of external card 24 to engage against body section 34. As is depicted by FIG. 5, insertion of a narrow card, such as the depicted wireless networking card, leaves member 36 extended to selectively adjust the width of external card blank 30 so that the gap between the inner edge of external card 24 and side wall 28 is filled. Member 36 extends a distance so that the width of external card blank 30 equals the width of external card 24, approximately 34 millimeters.

Although the present invention has been described in detail, it should be understood that various changes, substitutions and alterations can be made hereto without departing from the spirit and scope of the invention as defined by the appended claims.

What is claimed is:

1. An information handling system comprising:
   plural components operable to process information;
   a motherboard operable to interface the plural components;
   an external card bay interfaced with the motherboard and having signal connectors operable to communicate electrical signals between an external card and the plural components, the external card bay further having opposing side walls defining a width of the external card bay;
   an external card inserted in the external card bay and having signal connectors coupled to the external card bay connectors, the external card having a width of less than the external card bay width to leave a gap between the external card and a side wall; and
   an external card blank inserted in the external card bay and having a variable width adjustable to fill the gap between the card and the side wall.

2. The information handling system of claim 1 wherein the external card bay further has first and second horizontally disposed signal connectors, and wherein the external card blank fills the gap by adjusting to a width substantially equal to the width of the external card.

3. The information handling system of claim 1 wherein the external card bay further has first and second horizontally disposed signal connectors, and wherein the external card blank fills the gap by adjusting to a width substantially smaller than the width of the external card.

4. The information handling system of claim 1 wherein the external card bay further has first and second horizontally disposed signal connectors, wherein the external card coupled to the first signal connector, and wherein the external card blank further comprises:
   a base section operable to couple to the second signal connector;
   a body section extending out from the base section along a side wall of the external card bay; and
   an adjustable member extending from the body section to the external card.

5. The information handling system of claim 4 wherein the external card blank body section forms a housing sized to accept the adjustable member and the adjustable member rotationally couples to the body section, the adjustable member biased to extend into the external card bay when a gap exists between the body section and the external card and to rotate into the body section housing when the external card has a width that fills the gap.

6. The information handling system of claim 4 wherein the external card blank body section forms a housing sized to accept the adjustable member and the adjustable member laterally couples to the body section, the adjustable member biased to extend into the external card bay when a gap exists between the body section and the external card and to retract laterally into the body section housing when the external card has a width that fills the gap.

7. The information handling system of claim 4 further comprising a biasing mechanism coupled to the adjustable member and operable to bias the adjustable member from the body section into the external card bay.

8. The information handling system of claim 4 wherein the external card comprises a rotational storage media.

9. The information handling system of claim 4 wherein the external card comprises a wireless networking card.

10. A method for coupling an external card in an information handling system external card bay, the method comprising:
    inserting an external card blank against a first side wall of the external card bay;
    inserting the external card against a second side wall of the external card bay;
    coupling signal connectors of the external card to signal connectors of the external card bay;
    disposing a member between the external card blank and the external card; and
    adjusting the member to rest against the external card and the external card blank to maintain the external card against the second side wall.

11. The method of claim 10 wherein the external card bay has first and second signal connectors, the method further comprising:
    coupling the external card blank to the first connector; and
    coupling the external card to the second connector.

12. The method of claim 11 wherein the external card width is substantially one-half of the external card bay width, the method further comprising:
    removing the external card blank from the external card bay; and
    inserting a second external card into the external card bay, the second external card width substantially one-half of the external bay width, the second external card resting against the first external card and the first side wall in the place of the external card blank.

13. The method of claim 12 wherein the first external card comprises a wireless network card.

14. The method of claim 10 wherein adjusting the member further comprises:
    biasing the member to extend from the external card blank into the external card bay; and
    rotating the member from the external card bay into the external card blank when the external card inserts into the external card bay to rest against the second wall and the external card blank.

15. The method of claim 10 wherein adjusting the member further comprises:
    biasing the member to extend from the external card blank into the external card bay; and
    laterally retracting the member from the external card bay into the external card blank when the external card fits in the external card bay to rest against the second wall and the external card blank.

16. The method of claim 15 wherein the external card comprises a rotational storage device.

17. The method of claim 10 further comprising:
    assembling the external card and external card blank into a single assembly; and
    inserting the assembly into the external card bay.

18. A system for securing an expansion card in an information handling system expansion card bay, the expansion card bay having first and second connectors, the system comprising:
    a base having a connector operable to couple with the first expansion card bay connector;

a body extending from the base to align against an expansion card bay wall, the body having a width and a cavity; and an adjustable member coupled to the body, the adjustable member aligned to selectively extend from the body into the expansion card bay to engage an expansion card coupled to the second expansion card bay connector.

19. The system of claim 18 wherein the adjustable member rotationally couples to the body, the adjustable member extending into the expansion card bay to engage narrow expansion cards and rotating into the body cavity to provide space in the expansion card bay for wide expansion cards.

20. The system of claim 18 wherein the adjustable member laterally couples to the body, the adjustable member laterally extending into the expansion card bay to engage narrow expansion cards and laterally retracting into the body cavity to provide space in the expansion card bay for wide expansion cards.

* * * * *